US012446134B2

(12) United States Patent
Li et al.

(10) Patent No.: US 12,446,134 B2
(45) Date of Patent: Oct. 14, 2025

(54) TWO-COLOR LED LIGHT CIRCUIT AND A LED LIGHT CONTROL CIRCUIT

(71) Applicant: Shenzhen Yongxiangshun Electronic Technology Co., Ltd, Guangdong (CN)

(72) Inventors: Junfeng Li, Guangdong (CN); Bocai Li, Guangdong (CN)

(73) Assignee: Shenzhen Yongxiangshun Electronic Technology Co., Ltd, Guangdong (CN)

( * ) Notice: Subject to any disclaimer, the term of this patent is extended or adjusted under 35 U.S.C. 154(b) by 127 days.

(21) Appl. No.: 18/595,609

(22) Filed: Mar. 5, 2024

(65) Prior Publication Data
US 2025/0234440 A1 Jul. 17, 2025

(30) Foreign Application Priority Data
Jan. 17, 2024 (CN) .......................... 202420113775.9

(51) Int. Cl.
*H05B 45/50* (2022.01)
*H05B 45/54* (2020.01)
*H05B 45/56* (2020.01)

(52) U.S. Cl.
CPC ............. *H05B 45/56* (2020.01); *H05B 45/54* (2020.01)

(58) Field of Classification Search
CPC ........ H05B 45/00; H05B 45/40; H05B 45/50; H05B 45/56; H05B 47/24; H05B 47/25; H05B 47/28
See application file for complete search history.

(56) References Cited

U.S. PATENT DOCUMENTS

| | | | |
|---|---|---|---|
| 10,143,061 B2 * | 11/2018 | Zou | H02M 1/32 |
| 11,104,457 B1 * | 8/2021 | Brosh | G01R 1/203 |
| 2007/0138971 A1 * | 6/2007 | Chen | H05B 39/045 |
| | | | 315/209 R |
| 2011/0140620 A1 * | 6/2011 | Lin | H05B 45/10 |
| | | | 315/224 |

* cited by examiner

*Primary Examiner* — Thai Pham
(74) *Attorney, Agent, or Firm* — ScienBiziP, P.C.

(57) ABSTRACT

The present disclosure provides a two-color LED light circuit and an LED light control circuit, including an LED light switch control module configured for connecting with a switch signal chip and an LED light assembly, an overcurrent protection module connected with the LED light switch control module and configured for detecting overcurrent of the LED light assembly and disconnecting current of the LED light switch control module, an overtemperature protection module connected with the LED light switch control module and configured for detecting overtemperature of the LED light control circuit and disconnecting current of the LED light switch control module, and an under-voltage protection module connected with an LED light assembly voltage input and the LED light switch control module, configured for detecting an input voltage of the LED light assembly and disconnecting the current of the LED light switch control module when the input voltage is too low.

15 Claims, 5 Drawing Sheets

| IN1 | IN2 | OUT1 | OUT2 | Functions |
|---|---|---|---|---|
| Changing PWM | 0 | positive | negative | Controlling LED1 to change |
| 0 | Changing PWM | negative | positive | Controlling LED2 to change |
| 1 | 0 | positive | negative | LED1 being lighted on |
| 1 | 0 | positive | negative | Self-flash LED among the LED1 changing automatically (a few in the LED1 flashing) |
| ⊓⊔ OR ⊔⊓ Fixed PWM (selectable from 5%~95%) | 0 | positive | negative | LED1 being turned on (Luminance is controllable) |
| ⊓⊔ OR ⊔⊓ Fixed PWM (selectable from 5%~95%) | 0 | positive | negative | Self-flash LED among the LED1 being lighted on constantly (LED1 being lighted on constantly) |
| 0 | 1 | negative | positive | LED2 being lighted on |
| 0 | 1 | negative | positive | Self-flash LED among the LED2 changing automatically (a few in the LED2 flashing) |
| 0 | ⊓⊔ OR ⊔⊓ Fixed PWM (selectable from 5%~95%) | negative | positive | LED2 being turned on (Luminance is controllable) |
| 0 | ⊓⊔ OR ⊔⊓ Fixed PWM (selectable from 5%~95%) | negative | positive | Self-flash LED among the LED2 being lighted on constantly (LED2 being lighted on constantly) |
| ⊓⊔ OR ⊔⊓ Changing PWM (Opposite phase with IN2) | ⊔⊓ OR ⊓⊔ Changing PWM (Opposite phase with IN1) | positive/ negative | negative/ positive | Changing between LED1 and LED2 |
| ⊓⊔ OR ⊔⊓ Fixed PWM (Opposite phase with IN2) | ⊔⊓ OR ⊓⊔ Changing PWM (Opposite phase with IN1) | positive/ negative | negative/ positive | Changing between LED1 and LED2 |
| ⊓⊔ OR ⊔⊓ Changing PWM (Opposite phase with IN2) | ⊔⊓ OR ⊓⊔ Fixed PWM (Opposite phase with IN1) | positive/ negative | negative/ positive | Changing between LED1 and LED2 |

FIG. 5

TWO-COLOR LED LIGHT CIRCUIT AND A LED LIGHT CONTROL CIRCUIT

CROSS-REFERENCES TO RELATED APPLICATIONS

This application claims the benefit of priority to Chinese Patent Application Number 202420113775.9, filed on Jan. 17, 2024, in the China National Intellectual Property Administration. The entire contents of the above-identified application are hereby incorporated by reference.

FIELD OF THE INVENTION

The present disclosure relates to the field of LED light, particularly relates to a two-color LED light circuit and a LED light control circuit.

BACKGROUND

At present, two-color LED light and its controller are widely used in various light decoration fields, such as Christmas decorations, advertising board decorations, etc. When the manufacturers install a two-color LED light onto a two-color LED light controller, various issues will happen: a. The two-color LED light is short-circuited, causing the controller to burn out due to overcurrent or overtemperature of the two-color LED light; b. Improper operation by the operator may cause the two-color LED light controller to burn out.

SUMMARY OF THE DISCLOSURE

To address the problems in the above-mentioned background art, the present disclosure proposes a two-color LED light circuit and an LED light control circuit to thoroughly protect the two-color LED light circuit from burning out due to short-circuited and overtemperature during processing.

An LED light control circuit includes an LED light switch control module, an overcurrent protection module, an overtemperature protection module, and an under-voltage protection module.

The LED light switch control module is configured for connecting with a switch signal chip and an LED light assembly, so that a switch signal output by the switch signal chip controls the LED light assembly to turn on and off.

The overcurrent protection module is connected with the LED light switch control module and configured for detecting overcurrent of the LED light assembly and disconnecting current of the LED light switch control module, so that the LED light assembly is turned off by the LED light switch control module.

The overtemperature protection module is connected with the LED light switch control module and configured for detecting overtemperature of the LED light control circuit and disconnecting current of the LED light switch control module, so that the LED light assembly is turned off by the LED light switch control module.

The under-voltage protection module is connected with an LED light assembly voltage input and the LED light switch control module, configured for detecting an input voltage of the LED light assembly and disconnecting the current of the LED light switch control module when the input voltage is too low, so that the LED light assembly is turned off by the LED light switch control module.

Preferably, the LED light switch control module includes a first switch tube, a second switch tube, a third switch tube, a fourth switch tube, a fifth switch tube, and a sixth switch tube. The LED light assembly includes a voltage input, the voltage input further includes a first voltage input and a second voltage input.

One end of the first switch tube and one end of the third switch tube are connected in series through a first series connection end, and the first series connection end is connected with the first voltage input, while another end of the first switch tube is connected with the voltage input, and another end of the third switch tube is grounded.

One end of the second switch tube and one end of the fourth switch tube are connected in series through a second series connection end, and the second series connection end is connected with the second voltage input, while another end of the second switch tube is connected with the voltage input, and another end of the fourth switch tube is grounded.

The fifth switch tube comprises an input end, an output end, and a control end. The input end of the fifth switch tube is connected with a control end of the first switch tube, the output end of the fifth switch tube is connected with a control end of the fourth switch tube, the control end of the fifth switch tube is connected with a first output end of switch signal of the switch signal chip.

The sixth switch tube comprises an input end, an output end, and a control end. The input end of the sixth switch tube is connected with a control end of the second switch tube, the output end of the sixth switch tube is connected with a control end of the third switch tube, the control end of the sixth switch tube is connected with a second output end of switch signal of the switch signal chip.

Preferably, the LED light switch control module further includes a first resistor, a second resistor, a third resistor, a fourth resistor, a fifth resistor, and a sixth resistor.

The first switch tube is connected with the input end of the fifth switch tube through the first resistor, the second switch tube is connected with the input end of the sixth switch tube through the second resistor.

One end of the third resistor is connected with the control end of the fifth switch tube, another end of the third resistor is grounded; one end of the fourth resistor is connected with the control end of the sixth switch tube, another end of the fourth resistor is grounded; one end of the fifth resistor is connected with the control end of the third switch tube, another end of the fifth resistor is grounded; one end of the sixth switch tube is connected with the control end of the fourth switch tube, another end of the sixth resistor is grounded.

Preferably, the overcurrent protection module includes a first comparator, an overcurrent protection resistor, and a seventh switch tube.

The first comparator includes a positive input end, a negative input end, and an output end, the seventh switch tube includes an input end, an output end, and a control end. The positive input end of the first comparator is connected with the voltage reference input end, the negative input end of the first comparator is connected with one end of the overcurrent protection resistor, another end of the overcurrent protection resistor is connected with another end of the fourth switch tube and another end of the third switch tube, another end of the overcurrent protection resistor is grounded, the output end of the first comparator is connected with the control end of the seventh switch tube.

The input end of the seventh switch tube is connected with the first output end of switch signal and the second output end of switch signal, the output end of the seventh switch tube is grounded.

Preferably, the overtemperature protection module includes a thermistor and a second comparator.

The second comparator includes a positive input end, a negative input end, and an output end. One end of the thermistor is connected with the voltage reference input end, another end of the thermistor is connected with the negative input end of the second comparator, the positive input end of the second comparator is connected with the voltage reference input end, the output end of the second comparator is connected with the control end of the seventh switch tube.

Preferably, the under-voltage protection module includes an undervoltage resistor and a third comparator.

The third comparator includes a positive input end, a negative input end, and an output end. One end of the undervoltage resistor is connected with the voltage input end of the LED light assembly, another end of the undervoltage resistor is connected with the positive end of the third comparator, the negative end of the third comparator is connected with the voltage reference input end, the output end of the third comparator is connected with the control end of the seventh switch tube.

The present disclosure further provides a two-color LED light circuit, which includes a switch signal chip, an LED light assembly, and an LED light control circuit as described above.

Preferably, the LED light switch control module comprises a first switch tube, a second switch tube, a third switch tube, a fourth switch tube, a fifth switch tube, and a sixth switch tube, wherein the LED light assembly comprises a voltage input, the voltage input further comprises a first voltage input and a second voltage input. One end of the first switch tube and one end of the third switch tube are connected in series through a first series connection end, and the first series connection end is connected with the first voltage input, while another end of the first switch tube is connected with the voltage input, and another end of the third switch tube is grounded. One end of the second switch tube and one end of the fourth switch tube are connected in series through a second series connection end, and the second series connection end is connected with the second voltage input, while another end of the second switch tube is connected with the voltage input, and another end of the fourth switch tube is grounded. The fifth switch tube comprises an input end, an output end, and a control end. The input end of the fifth switch tube is connected with a control end of the first switch tube, the output end of the fifth switch tube is connected with a control end of the fourth switch tube, the control end of the fifth switch tube is connected with a first output end of switch signal of the switch signal chip. The sixth switch tube comprises an input end, an output end, and a control end. The input end of the sixth switch tube is connected with a control end of the second switch tube, the output end of the sixth switch tube is connected with a control end of the third switch tube, the control end of the sixth switch tube is connected with a second output end of switch signal of the switch signal chip.

The LED light assembly further includes a first LED light and a second LED light. A positive end of the first LED light is connected with the first voltage input, a negative end of the first LED light is connected with the second voltage input. A positive end of the second LED light is connected with the second voltage input, a negative end of the second LED light is connected with the first voltage input.

Preferably, the first LED light includes at least one LED light connected in series, and the second LED light includes at least one LED light connected in series.

A positive end of a series of the at least one first LED light is connected with the first voltage input, while a negative end of the series of the at least one first LED light is connected with the second voltage input.

A positive end of a series of the at least one second LED light is connected with the second voltage input, while a negative end of the series of the at least one second LED light is connected with the first voltage input.

Preferably, a first switch signal output by the first output end of switch signal of the switch signal chip is a high electrical level signal, a PWM (Pulse Width Modulation) signal, or no signal. A second switch signal output by the second output end of switch signal of the switch signal chip is a high electrical level signal, a PWM signal, or no signal.

The two-color LED light circuit and the LED light control circuit as described above includes an LED light switch control module, an overcurrent protection module, an overtemperature protection module, and an under-voltage protection module. The LED light switch control module is configured for connecting with a switch signal chip and an LED light assembly, so that a switch signal output by the switch signal chip controls the LED light assembly to turn on and off. The overcurrent protection module is connected with the LED light switch control module and configured for detecting overcurrent of the LED light assembly and disconnecting current of the LED light switch control module, so that the LED light assembly is turned off by the LED light switch control module. The overtemperature protection module is connected with the LED light switch control module and configured for detecting overtemperature of the LED light control circuit and disconnecting current of the LED light switch control module, so that the LED light assembly is turned off by the LED light switch control module. The under-voltage protection module is connected with an LED light assembly voltage input and the LED light switch control module, configured for detecting an input voltage of the LED light assembly and disconnecting the LED light switch control module when the input voltage is too low, so that the LED light assembly is turned off by the LED light switch control module. Hence, by configuring the LED light switch control module, the overcurrent protection module, the overtemperature protection module, and the under-voltage protection module in the LED light control circuit, it can thoroughly protect the two-color LED light circuit from burning out due to short-circuited and overtemperature during processing.

BRIEF DESCRIPTION OF THE DRAWINGS

FIG. 5 is a table diagram illustrating the control logic and status control of switch signals output by a switch signal chip.

DETAILED DESCRIPTION

In order to further describe the technical solutions of the present disclosure, specific embodiments of the present disclosure combined with the accompanying drawings are stand here. It should be understood that the detailed embodiments of the disclosure described here are used to explain the present disclosure only, instead of limiting the present disclosure.

Figure 1:
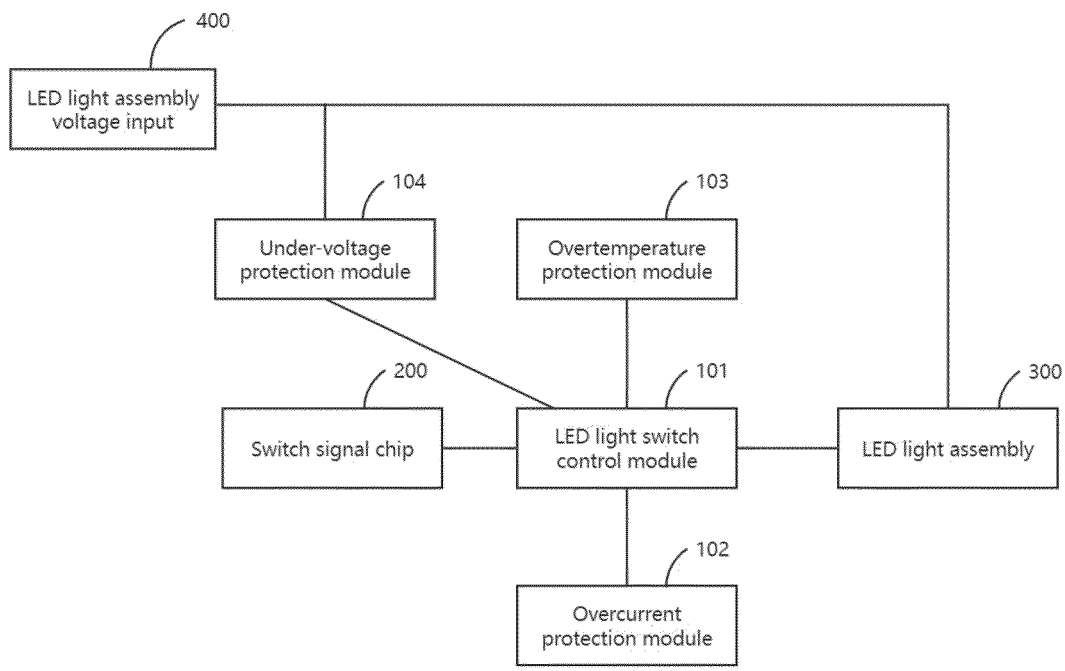
FIG. 1 is a block diagram illustrating an LED light control circuit.

Referring to FIG. 1, the present disclosure provides an LED light control circuit, which includes an LED light switch control module 101, an overcurrent protection module 102, an overtemperature protection module 103, and an under-voltage protection module 104. The LED light switch control module 101 is configured for connecting with a switch signal chip 200 and an LED light assembly 300, so that a switch signal output by the switch signal chip 200 controls the LED light assembly 300 to turn on and off. The overcurrent protection module 102 is connected with the LED light switch control module 101 and configured for detecting overcurrent of the LED light assembly 300 and disconnecting current of the LED light switch control module 101, so that the LED light assembly 300 is turned off by the LED light switch control module 101. The overtemperature protection module 103 is connected with the LED light switch control module 101 and configured for detecting overtemperature of the LED light control circuit and disconnecting current of the LED light switch control module 101, so that the LED light assembly 300 is turned off by the LED light switch control module 101. The under-voltage protection module 104 is connected with an LED light assembly voltage input 400 and the LED light switch control module 101, configured for detecting an input voltage of the LED light assembly 300 and disconnecting the current of the LED light switch control module 101 when the input voltage is too low, so that the LED light assembly 300 is turned off by the LED light switch control module 101. Wherein, the overcurrent of the LED light assembly 300 is referred to as the current of the LED light assembly 300 exceeding a set current value, the overtemperature of the LED light control circuit is referred to as the temperature of the LED light control circuit exceeding a set temperature value, and the too low input voltage of the LED light assembly 300 is referred to as the input voltage of the LED light assembly 300 less than a set voltage value.

Preferably, the LED light switch control module 101 includes a first switch tube, a second switch tube, a third switch tube, a fourth switch tube, a fifth switch tube, and a sixth switch tube. The LED light assembly 300 includes a voltage input, the voltage input further includes a first voltage input and a second voltage input. One end of the first switch tube and one end of the third switch tube are connected in series through a first series connection end, and the first series connection end is connected with the first voltage input, while another end of the first switch tube is connected with the voltage input, and another end of the third switch tube is grounded. One end of the second switch tube and one end of the fourth switch tube are connected in series through a second series connection end, and the second series connection end is connected with the second voltage input, while another end of the second switch tube is connected with the voltage input, and another end of the fourth switch tube is grounded. The fifth switch tube comprises an input end, an output end, and a control end. The input end of the fifth switch tube is connected with a control end of the first switch tube, the output end of the fifth switch tube is connected with a control end of the fourth switch tube, the control end of the fifth switch tube is connected with a first output end of switch signal of the switch signal chip. The sixth switch tube comprises an input end, an output end, and a control end. The input end of the sixth switch tube is connected with a control end of the second switch tube, the output end of the sixth switch tube is connected with a control end of the third switch tube, the control end of the sixth switch tube is connected with a second output end of switch signal of the switch signal chip.

Wherein, the LED light switch control module further includes a first resistor, a second resistor, a third resistor, a fourth resistor, a fifth resistor, and a sixth resistor. The first switch tube is connected with the input end of the fifth switch tube through the first resistor, the second switch tube is connected with the input end of the sixth switch tube through the second resistor. One end of the third resistor is connected with the control end of the fifth switch tube, another end of the third resistor is grounded; one end of the fourth resistor is connected with the control end of the sixth switch tube, another end of the fourth resistor is grounded; one end of the fifth resistor is connected with the control end of the third switch tube, another end of the fifth resistor is grounded; one end of the sixth switch tube is connected with the control end of the fourth switch tube, another end of the sixth resistor is grounded.

Figure 2:
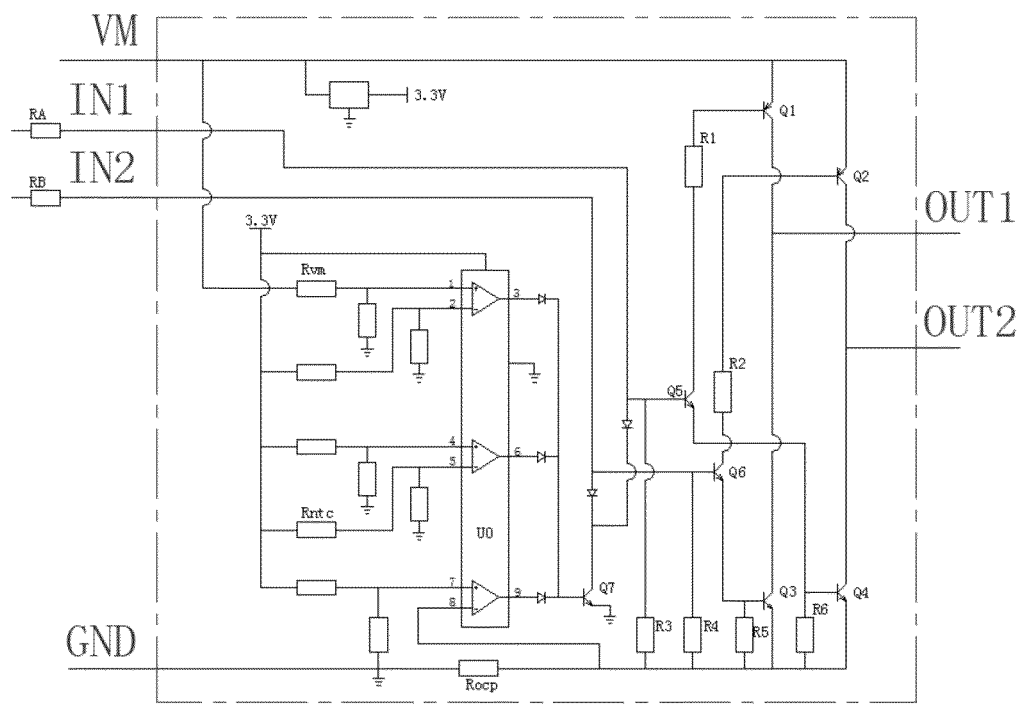
FIG. 2 is a schematic diagram illustrating a circuit of the LED light control circuit in FIG. 1.

Specifically, referring to FIG. 2, the first switch tube, the second switch tube, the third switch tube, the fourth switch tube, the fifth switch tube, and the sixth switch tube are shown as Q1, Q2, Q3, Q4, Q5, and Q6 respectively. The first resistor, the second resistor, the third resistor, the fourth resistor, the fifth resistor, and the sixth resistor are shown as R1, R2, R3, R4, R5, and R6 respectively. GND is referred to as a grounded end. OUT1 is referred to as the first voltage input of the LED light assembly, and OUT2 is referred to as the second voltage input of the LED light assembly. IN1 refers to the first output end of switch signal, and IN2 refers to the second output end of switch signal. VM refers to the LED light assembly voltage input.

Preferably, the overcurrent protection module includes a first comparator, an overcurrent protection resistor, and a seventh switch tube. The first comparator includes a positive input end, a negative input end, and an output end, the seventh switch tube includes an input end, an output end, and a control end. The positive input end of the first comparator is connected with the voltage reference input end, the negative input end of the first comparator is connected with one end of the overcurrent protection resistor, another end of the overcurrent protection resistor is connected with another end of the fourth switch tube and another end of the third switch tube, another end of the overcurrent protection resistor is grounded, the output end of the first comparator is connected with the control end of the seventh switch tube. The input end of the seventh switch tube is connected with the first output end of switch signal and the second output end of switch signal, the output end of the seventh switch tube is grounded.

Specifically, referring to FIG. 2, Rocp is referred to as the overcurrent protection resistor, Q7 is referred to as the seventh switch tube. As shown in FIG. 2, the first comparator is connected with the Rocp. One end of the Rocp is connected with a pin 8 of the first comparator, and also connected with the Q3 and the Q4. The other end of the Rocp is grounded. A pin 7 of the first comparator is connected with the voltage reference input end. The reference voltage of the voltage reference input end is 3.3V. As shown in FIG. 2, the pin 7 of the first comparator is also connected with the voltage reference input end through a resistor. The output end of the first comparator is referred to as a pin 9.

Referring to FIG. 2, when a load connected to the OUT1 and the OUT2 increases, the internal resistance of the LED light control circuit decreases relatively, causing the current of the Rocp to increase, so as to increase the voltage on the pin 8 of the first comparator. When the voltage on the pin 8 is higher than the voltage on the pin 7, the voltage on the pin 9 changes from low electrical level to high electrical level, the Q7 turns on, causing the Q2 and the Q3 to cut off, and the Q1 and the Q4 is cut off at the same time, so that no output at the OUT1 and the OUT2.

Preferably, the overtemperature protection module includes a thermistor and a second comparator. The second comparator includes a positive input end, a negative input end, and an output end. One end of the thermistor is connected with the voltage reference input end, another end of the thermistor is connected with the negative input end of the second comparator, the positive input end of the second comparator is connected with the voltage reference input end, the output end of the second comparator is connected with the control end of the seventh switch tube.

Specifically, referring to FIG. 2, the thermistor is referred to as Rntc. The second comparator is connected with the Rntc. One end of the Rntc is connected with the voltage reference input end, the other end of the Rntc is connected with a pin 5 of the second comparator. A pin 4 of the second comparator is connected with the voltage reference input end with a voltage of 3.3V. Alternatively, the pin 4 of the second comparator is connected with the voltage reference input end with a voltage of 3.3V through a resistor. The output end of the second comparator is referred to as a pin 6.

Specifically, when temperature increases, the internal resistance of the Rntc decreases, causing the voltage on the pin 5 of the second comparator to increase. When the voltage on the pin 5 is higher than the voltage on the pin 4, the voltage on the pin 6 changes from low electrical level to high electrical level, the Q7 turns on, causing the Q2 and the Q3 to cut off, and the Q1 and the Q4 is cut off at the same time, so that no output at the OUT1 and the OUT2.

Preferably, the under-voltage protection module includes an undervoltage resistor and a third comparator. The third comparator includes a positive input end, a negative input end, and an output end. One end of the undervoltage resistor is connected with the voltage input end of the LED light assembly, another end of the undervoltage resistor is connected with the positive end of the third comparator, the negative end of the third comparator is connected with the voltage reference input end, the output end of the third comparator is connected with the control end of the seventh switch tube.

Specifically, the undervoltage resistor is referred to as Rvm. One end of the Rvm is connected with the VM, the other end of the Rvm is connected with a pin 1 of the third comparator. A pin 2 of the third comparator is connected with the voltage reference input end with a voltage of 3.3V. Alternatively, the pin 2 of the third comparator is connected with the voltage reference input end with a voltage of 3.3V through a resistor. The output end of the third comparator is referred to as a pin 3.

Specifically, when the voltage of the VM decreases, the voltage passing through the Rvm decreases, causing the voltage on the pin 1 of the third comparator to decrease. When the voltage on the pin 1 is lower than the voltage on the pin 2, the voltage on the pin 3 changes from low electrical level to high electrical level, the Q7 turns on, causing the Q2 and the Q3 to cut off, and the Q1 and the Q4 is cut off at the same time, so that no output at the OUT1 and the OUT2.

The present disclosure further provides a two-color LED light circuit, which includes a switch signal chip, an LED light assembly, and an LED light control circuit as described above.

Preferably, the LED light switch control module comprises a first switch tube, a second switch tube, a third switch tube, a fourth switch tube, a fifth switch tube, and a sixth switch tube, wherein the LED light assembly comprises a voltage input, the voltage input further comprises a first voltage input and a second voltage input. One end of the first switch tube and one end of the third switch tube are connected in series through a first series connection end, and the first series connection end is connected with the first voltage input, while another end of the first switch tube is connected with the voltage input, and another end of the third switch tube is grounded. One end of the second switch tube and one end of the fourth switch tube are connected in series through a second series connection end, and the second series connection end is connected with the second voltage input, while another end of the second switch tube is connected with the voltage input, and another end of the fourth switch tube is grounded. The fifth switch tube comprises an input end, an output end, and a control end. The input end of the fifth switch tube is connected with a control end of the first switch tube, the output end of the fifth switch tube is connected with a control end of the fourth switch tube, the control end of the fifth switch tube is connected with a first output end of switch signal of the switch signal chip. The sixth switch tube comprises an input end, an output end, and a control end. The input end of the sixth switch tube is connected with a control end of the second switch tube, the output end of the sixth switch tube is connected with a control end of the third switch tube, the control end of the sixth switch tube is connected with a second output end of switch signal of the switch signal chip. The LED light assembly further includes a first LED light and a second LED light. A positive end of the first LED light is connected with the first voltage input, a negative end of the first LED light is connected with the second voltage input. A positive end of the second LED light is connected with the second voltage input, a negative end of the second LED light is connected with the first voltage input.

Preferably, the first LED light includes at least one LED light connected in series, and the second LED light includes at least one LED light connected in series. A positive end of a series of the at least one first LED light is connected with the first voltage input, which is shown as "a" in FIG. 3, while a negative end of the series of the at least one first LED light is connected with the second voltage input, which is shown as "a1" in FIG. 3. A positive end of a series of the at least one second LED light is connected with the second voltage input, which is shown as "a1" in FIG. 3, while a negative end of the series of the at least one second LED light is connected with the first voltage input, which is shown as "a" in FIG. 3.

Figure 3:
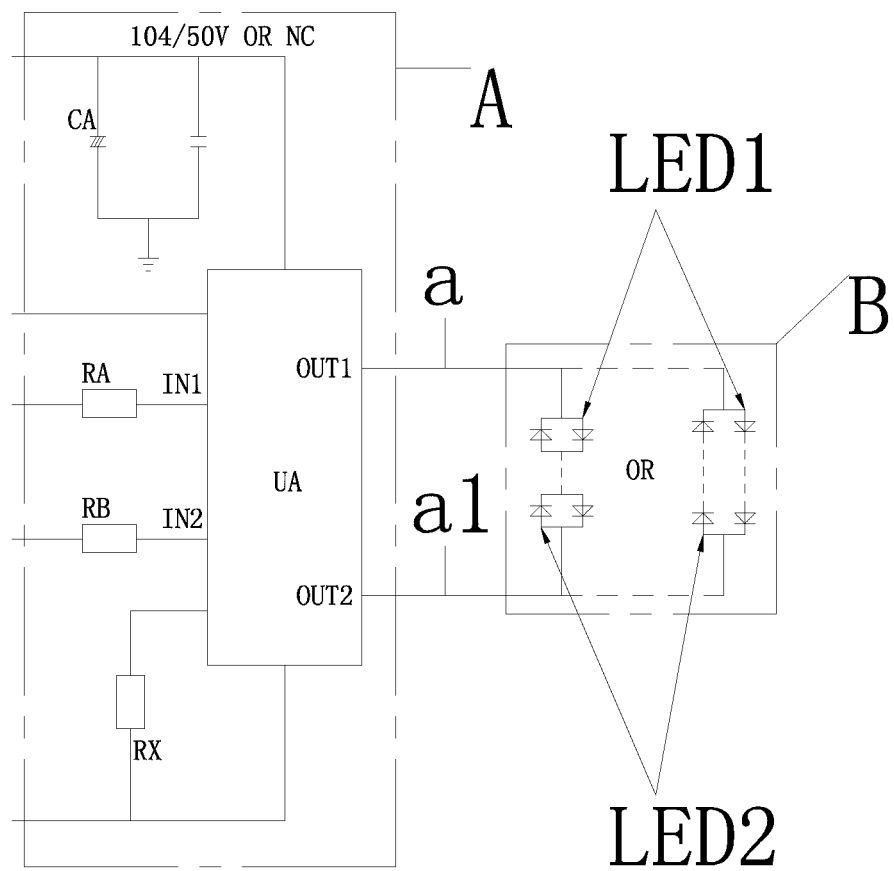
FIG. 3 is a schematic diagram illustrating a local circuit of a two-color LED light circuit.

Specifically, referring to FIG. 3, the LED light control circuit is integrated into a chip UA. The first LED light is referred to as an LED1. The second LED light is referred to as an LED2. The connection between the LED1 and the LED2 is shown in box "B" in FIG. 3. Additionally, in FIG. 3, "CA" refers to an electrolytic capacitor, or any other capacitor in various materials; "RA" refers to a resistor A; "RB" refers to a resistor B; "RX" refers to a resistor X.

Preferably, a first switch signal "L1" output by the first output end of switch signal of the switch signal chip is a high electrical level signal, a PWM signal, or no signal. A second switch signal "L2" output by the second output end of switch signal of the switch signal chip is a high electrical level signal, a PWM signal, or no signal.

Figure 4:
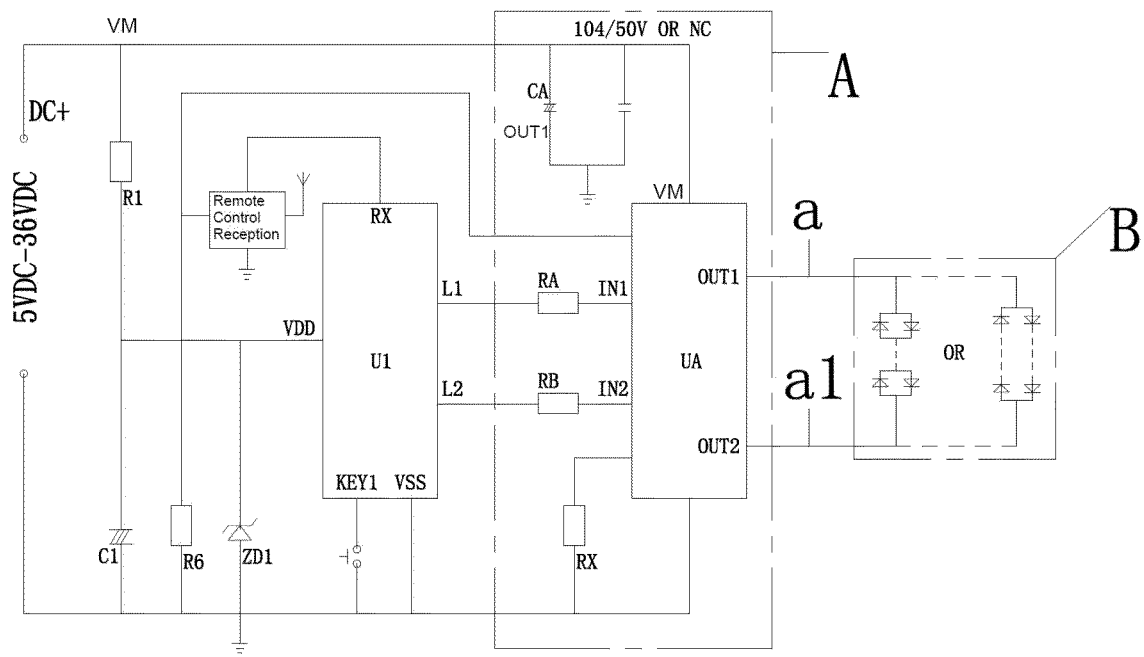
FIG. 4 is a schematic diagram illustrating the two-color LED light circuit.

Specifically, referring to FIG. 4, the switch signal chip is referred to as a chip U1. The main part of the two-color LED light circuit is shown in box "A" in FIG. 4. The first switch signal "L1" and the second switch signal "L2" are output by the chip U1. The first switch signal input to the pin IN1, the second switch signal input to the pin IN2, and the state of controlling the LED light are shown in FIG. 5. The PWM frequency is selectable in the range from 60 Hz to 10 KHz. Additionally, in FIG. 4, "C1" refers to a Capacitor 1; "ZD1" refers to a Zener Diode 1; "VDD" refers to Voltage Direct Drain; "RX" refers to a resistor X; "VSS" refers to Voltage Source Substrate; "CA" refers to an electrolytic capacitor, or any other capacitor in various materials; "RA" refers to a resistor A; "RB" refers to a resistor B.

In one embodiment, all the LED1 is ordinary LED light. In another embodiment, the LED1 includes ordinary LED lights and self-flash LED lights ranging from 1% to 99%.

In one embodiment, all the LED2 is ordinary LED light. In another embodiment, the LED2 includes ordinary LED lights and self-flash LED lights ranging from 1% to 99%.

According to the two-color LED light circuit as described above, the chip UA provides a comprehensive protection against faults and short circuit issues, including undervoltage lockout (UVLO), overcurrent protection (OCP), and temperature safety device (TSD). After the fault is eliminated, the chip UA will automatically return to normal operation, making the product more environmentally friendly and energy-saving. In addition, the safety of the product is increased, and the two-color LED light controller will not heat up and catch fire due to a short circuit in the light string, that is, an increase in the current in the light string.

The specific embodiments described herein are preferable examples to illustrate the spirit of the present disclosure only and not limiting the scope of this disclosure. Those skilled in the art to which the present disclosure belongs can make various modifications or additions to the specific embodiments described or use similar alternatives, but they will not deviate from the spirit or exceed the scope of the present disclosure.

What is claimed is:

1. An LED light control circuit, comprising:
   an LED light switch control module, configured for connecting with a switch signal chip and an LED light assembly, so that a switch signal output by the switch signal chip controlling the LED light assembly to turn on and off;
   an overcurrent protection module connected with the LED light switch control module and configured for detecting overcurrent of the LED light assembly and disconnecting current of the LED light switch control module, so that the LED light assembly being turned off by the LED light switch control module;
   an overtemperature protection module connected with the LED light switch control module and configured for detecting overtemperature of the LED light control circuit and disconnecting current of the LED light switch control module, so that the LED light assembly being turned off by the LED light switch control module; and
   an under-voltage protection module connected with an LED light assembly voltage input and the LED light switch control module, configured for detecting an input voltage of the LED light assembly and disconnecting current of the LED light switch control module when the input voltage is too low, so that the LED light assembly being turned off by the LED light switch control module.

2. The LED light control circuit according to claim 1, the LED light switch control module comprising a first switch tube, a second switch tube, a third switch tube, a fourth switch tube, a fifth switch tube, and a sixth switch tube, wherein
   the LED light assembly comprises a voltage input, the voltage input further comprises a first voltage input and a second voltage input;
   one end of the first switch tube and one end of the third switch tube are connected in series through a first series connection end, and the first series connection end is connected with the first voltage input, while another end of the first switch tube is connected with the voltage input, and another end of the third switch tube is grounded;
   one end of the second switch tube and one end of the fourth switch tube are connected in series through a second series connection end, and the second series connection end is connected with the second voltage input, while another end of the second switch tube is connected with the voltage input, and another end of the fourth switch tube is grounded;
   the fifth switch tube comprises an input end, an output end, and a control end;
   the input end of the fifth switch tube is connected with a control end of the first switch tube, the output end of the fifth switch tube is connected with a control end of the fourth switch tube, the control end of the fifth switch tube is connected with a first output end of switch signal of the switch signal chip;
   the sixth switch tube comprises an input end, an output end, and a control end;
   the input end of the sixth switch tube is connected with a control end of the second switch tube, the output end of the sixth switch tube is connected with a control end of the third switch tube, the control end of the sixth switch tube is connected with a second output end of switch signal of the switch signal chip.

3. The LED light control circuit according to claim 2, the LED light switch control module further comprising a first resistor, a second resistor, a third resistor, a fourth resistor, a fifth resistor, and a sixth resistor,
   the first switch tube is connected with the input end of the fifth switch tube through the first resistor, the second switch tube is connected with the input end of the sixth switch tube through the second resistor;
   one end of the third resistor is connected with the control end of the fifth switch tube, another end of the third resistor is grounded; one end of the fourth resistor is connected with the control end of the sixth switch tube, another end of the fourth resistor is grounded; one end of the fifth resistor is connected with the control end of the third switch tube, another end of the fifth resistor is grounded; one end of the sixth switch tube is connected with the control end of the fourth switch tube, another end of the sixth resistor is grounded.

4. The LED light control circuit according to claim 2, wherein the overcurrent protection module comprises a first comparator, an overcurrent protection resistor, and a seventh switch tube,
   the first comparator includes a positive input end, a negative input end, and an output end, the seventh switch tube includes an input end, an output end, and a control end, the positive input end of the first comparator is connected with the voltage reference input end, the negative input end of the first comparator is connected with one end of the overcurrent protection resistor, another end of the overcurrent protection resistor is connected with another end of the fourth switch tube and another end of the third switch tube, another end of the overcurrent protection resistor is grounded, the output end of the first comparator is connected with the control end of the seventh switch tube, the input end of the seventh switch tube is connected with the first output end of switch signal and the second output end of switch signal, the output end of the seventh switch tube is grounded.

5. The LED light control circuit according to claim 4, wherein the overtemperature protection module comprises a thermistor and a second comparator, the second comparator includes a positive input end, a negative input end, and an output end, one end of the thermistor is connected with the voltage reference input end, another end of the thermistor is connected with the negative input end of the second comparator, the positive input end of the second comparator is connected with the voltage reference input end, the output end of the second comparator is connected with the control end of the seventh switch tube.

6. The LED light control circuit according to claim 5, wherein the under-voltage protection module comprises an undervoltage resistor and a third comparator, the third comparator includes a positive input end, a negative input end, and an output end, one end of the undervoltage resistor is connected with the voltage input end of the LED light assembly, another end of the undervoltage resistor is connected with the positive end of the third comparator, the negative end of the third comparator is connected with the voltage reference input end, the output end of the third comparator is connected with the control end of the seventh switch tube.

7. A two-color LED light circuit, comprising a switch signal chip, an LED light assembly, and an LED light control circuit according to claim 1, wherein the LED light control circuit comprises:

an LED light switch control module, configured for connecting with the switch signal chip and the LED light assembly, so that a switch signal output by the switch signal chip controlling the LED light assembly to turn on and off;

an overcurrent protection module connected with the LED light switch control module and configured for detecting overcurrent of the LED light assembly and disconnecting current of the LED light switch control module, so that the LED light assembly being turned off by the LED light switch control module;

an overtemperature protection module connected with the LED light switch control module and configured for detecting overtemperature of the LED light control circuit and disconnecting current of the LED light switch control module, so that the LED light assembly is turned off by the LED light switch control module; and an under-voltage protection module connected with an LED light assembly voltage input and the LED light switch control module, configured for detecting an input voltage of the LED light assembly and disconnecting current of the LED light switch control module when the input voltage is too low, so that the LED light assembly is turned off by the LED light switch control module.

8. The two-color LED light circuit according to claim 7, the LED light switch control module comprising a first switch tube, a second switch tube, a third switch tube, a fourth switch tube, a fifth switch tube, and a sixth switch tube, wherein the LED light assembly comprises a voltage input, the voltage input further comprises a first voltage input and a second voltage input;

one end of the first switch tube and one end of the third switch tube are connected in series through a first series connection end, and the first series connection end is connected with the first voltage input, while another end of the first switch tube is connected with the voltage input, and another end of the third switch tube is grounded;

one end of the second switch tube and one end of the fourth switch tube are connected in series through a second series connection end, and the second series connection end is connected with the second voltage input, while another end of the second switch tube is connected with the voltage input, and another end of the fourth switch tube is grounded;

the fifth switch tube comprises an input end, an output end, and a control end;

the input end of the fifth switch tube is connected with a control end of the first switch tube, the output end of the fifth switch tube is connected with a control end of the fourth switch tube, the control end of the fifth switch tube is connected with a first output end of switch signal of the switch signal chip;

the sixth switch tube comprises an input end, an output end, and a control end;

the input end of the sixth switch tube is connected with a control end of the second switch tube, the output end of the sixth switch tube is connected with a control end of the third switch tube, the control end of the sixth switch tube is connected with a second output end of switch signal of the switch signal chip.

9. The two-color LED light circuit according to claim 8, wherein the LED light switch control module further comprises a first resistor, a second resistor, a third resistor, a fourth resistor, a fifth resistor, and a sixth resistor, the first switch tube is connected with the input end of the fifth switch tube through the first resistor, the second switch tube is connected with the input end of the sixth switch tube through the second resistor;

one end of the third resistor is connected with the control end of the fifth switch tube, another end of the third resistor is grounded; one end of the fourth resistor is connected with the control end of the sixth switch tube, another end of the fourth resistor is grounded; one end of the fifth resistor is connected with the control end of the third switch tube, another end of the fifth resistor is grounded; one end of the sixth switch tube is connected with the control end of the fourth switch tube, another end of the sixth resistor is grounded.

10. The two-color LED light circuit according to claim 9, wherein the overcurrent protection module comprises a first comparator, an overcurrent protection resistor, and a seventh switch tube, the first comparator includes a positive input end, a negative input end, and an output end, the seventh switch tube includes an input end, an output end, and a control end, the positive input end of the first comparator is connected with the voltage reference input end, the negative input end of the first comparator is connected with one end of the overcurrent protection resistor, another end of the overcurrent protection resistor is connected with another end of the fourth switch tube and another end of the third switch tube, another end of the overcurrent protection resistor is grounded, the output end of the first comparator is connected with the control end of the seventh switch tube, the input end of the seventh switch tube is connected with the first output end of switch signal and the second output end of switch signal, the output end of the seventh switch tube is grounded.

11. The two-color LED light circuit according to claim 10, wherein the overtemperature protection module comprises a thermistor and a second comparator, the second comparator includes a positive input end, a negative input end, and an output end, one end of the thermistor is connected with the voltage reference input end, another end of the thermistor is connected with the negative input end of the second comparator, the positive input end of the second comparator is connected with the voltage reference input end, the output end of the second comparator is connected with the control end of the seventh switch tube.

12. The two-color LED light circuit according to claim 11, wherein the under-voltage protection module comprises an undervoltage resistor and a third comparator, the third comparator includes a positive input end, a negative input end, and an output end, one end of the undervoltage resistor is connected with the voltage input end of the LED light assembly, another end of the undervoltage resistor is connected with the positive end of the third comparator, the negative end of the third comparator is connected with the voltage reference input end, the output end of the third comparator is connected with the control end of the seventh switch tube.

13. The two-color LED light circuit according to claim 8, wherein a first switch signal output by the first output end of switch signal of the switch signal chip is a high electrical level signal, a PWM signal, or no signal, a second switch signal output by the second output end of switch signal of the switch signal chip is a high electrical level signal, a PWM signal, or no signal.

14. The two-color LED light circuit according to claim 7, wherein the LED light assembly comprises a voltage input, the voltage input further comprises a first voltage input and a second voltage input, the LED light assembly further comprises a first LED light and a second LED light, a positive end of the first LED light is connected with the first voltage input, a negative end of the first LED light is connected with the second voltage input, a positive end of the second LED light is connected with the second voltage input, a negative end of the second LED light is connected with the first voltage input.

15. The two-color LED light circuit according to claim 14, wherein the first LED light comprises at least one LED light connected in series, and the second LED light comprises at least one LED light connected in series, a positive end of a series of the at least one first LED light is connected with the first voltage input, a negative end of the series of the at least one first LED light is connected with the second voltage input, a positive end of a series of the at least one second LED light is connected with the second voltage input, a negative end of the series of the at least one second LED light is connected with the first voltage input.

* * * * *